Patented May 14, 1940

2,200,473

UNITED STATES PATENT OFFICE 2,200,473

BLOWING AGENT FOR SPONGE RUBBER

Albert F. Hardman, Akron, Ohio, assignor to Wingfoot Corporation, Wilmington, Del., a corporation of Delaware No Drawing. Application March 23, 1936, Serial No. 70,391

4 Claims. (Cl. 260—724)

This invention relates to a new chemical compound which has been found to be an efficient and useful blowing agent in the manufacture of sponge rubber.

In the manufacture of sponge rubber it is customary to incorporate in a soft, vulcanizable rubber dough a certain percentage of one or more chemicals which, during the operation of heating to produce vulcanization, decompose to form bubbles of gas in the mixture and thus cause it to expand and fill the mold cavity, developing at the same time the porous characteristics desired. The two chemicals most commonly used for this purpose are sodium bicarbonate and ammonium bicarbonate, with or without the addition of certain acids which promote the decomposition of the chemicals named. The products of reaction in the case of sodium bicarbonate are carbon dioxide, water and the sodium salts of the natural rubber acids or of any added acids, while in the case of ammonium bicarbonate the products of reaction are carbon dioxide, water and ammonia, since at the temperature of vulcanization ammonia does not form stable salts with weak organic acids.

The use of sodium bicarbonate offers the advantage of a uniform, finely divided material that is stable in storage and compounding. In fact, it is too stable at the temperatures ordinarily used during vulcanization, and will give no appreciable blowing effect without the addition of large amounts of acids such as stearic, oleic, lauric, acetic, etc., which are left in the rubber article after vulcanization is complete in the form of water soluble sodium salts or soaps. Ammonium bicarbonate, while much more efficient as a blowing agent than the sodium compound and leaving no soluble salts in the rubber, has the serious disadvantages of being unstable in storage and handling, and is usually coarse and irregular in crystal structure. Since the texture of sponge rubber is dependent on the size and distribution of the cells or pores in the vulcanized articles, it is highly important that the particles of the chemical used as blowing agent should be fine and uniform in size. For these reasons, neither of these commonly used chemicals is wholly satisfactory.

I have discovered a new chemical compound that possesses much of the stability and fine physical division of sodium bicarbonate and also the superior blowing power and freedom from water soluble residues that characterizes ammonium bicarbonate. This new chemical compound is easily prepared by mixing approximately equal molecular quantities of ammonium bicarbonate and zinc oxide, either simply as the dry powders or suspended in an organic solvent or even as a concentrated master batch in rubber itself. Neither the exact course of the reaction that occurs nor the molecular configuration of the resulting product is definitely known. There is a molecule of water eliminated during the reaction and the product obtained can be shown by analysis to contain zinc oxide, carbon dioxide and ammonia in approximate molecular proportions. The product is decomposed by water, particularly at elevated temperatures, with the liberation of ammonia and part of the carbon dioxide, the final product of decomposition in boiling water being basic zinc carbonate.

Since a molecule of water must be removed from the reaction product to obtain stability, it is advantageous to carry out the reaction in an organic liquid with which water is freely miscible, such as the lower alcohols. When carried out, for example, in methyl alcohol, after the reaction is finished the product, in the form of finely divided crystals, may be filtered and washed with a little fresh solvent and will then be substantially free from water, whereas if carried out by simply mixing the dry powders or by suspending in a liquid non-miscible with water, such as benzol, the resulting product is pasty from the water of reaction and dries with decomposition to form hard lumps. As stated above, the reaction may be carried out in rubber by simply mixing a fairly high concentration of zinc oxide and ammonium bicarbonate into rubber and allowing to stand at room temperatures for 24 hours or longer. The disadvantages here are that the reaction starts before the milling in of the two substances can be completed and a loss of ammonia and carbon dioxide occurs. Also, after the reaction, the rubber master batch is wet from the water of reaction and must be sheeted thin and dried with a minimum of working or heating before the reaction product is stabilized. In other words, however the reaction is carried out, the water liberated must be removed without much heat, or decomposition will occur.

To illustrate the preparation of this new material, the following are typical experiments:

Example 1

Ten and one-half pounds of technical ammonium bicarbonate were roughly pulverized and sifted through a 20 mesh sieve to remove any large lumps. This was mixed with nine pounds of ordinary zinc oxide in a five gallon open container and about two gallons of methyl alcohol were added. The mixture was stirred well, allowed to stand for three hours and then thoroughly stirred again. The container was then loosely covered and the mixture allowed to stand for twenty hours. The reaction product was then filtered out, washed with about a gallon of fresh methyl alcohol and dried spread out in open air for fifteen hours at room temperature. Fifteen pounds of a dry powder were obtained, which, after sifting through a 100 mesh sieve to remove a small amount of lumpy material, were ready for use. This powder was seen under the microscope to be distinctly crystalline and of fairly large particle size. It was free flowing, easily sifted and quite stable when stored in closed containers. A carefully dried sample gave the following analysis:

| | Per cent by weight |
|---|---|
| Ammonia (Kjeldahl method) | 11.5 |
| Carbon dioxide (loss of weight method) | 28.55 |
| Zinc oxide (by ignition) | 59.9 |

*Example 2*

A master batch of the same material of approximately 50% concentration was prepared in rubber as follows:

A. 1140 g. coarse ammonium bicarbonate were milled into 1000 g. pale crepe rubber on an open mill.

B. 1140 g. zinc oxide were milled in a similar fashion into a similar quantity of pale crepe.

The two half batches A and B, after cooling, were rolled together by passing through a cold mill five times, and then rolled up and set aside. The mixture became very gassy and full of blisters towards the last of the operation, and the odor of ammonia was strong. After standing for three hours, the mixture was again passed through a cold mill four times, and rolled up and set aside for sixteen hours. It was then cut up and the pieces passed once through a tightly set, cold mill. This was difficult, for the rubber mix was found to be wet and slippery on the rolls and again the odor of ammonia was strong, indicating decomposition. The thinly sheeted or shredded rubber batch was then dried 48 hours exposed to warm air. It was then returned to the mill and worked for a few minutes and was found to be smooth and coherent, a neutral gray in color and with little or no odor of ammonia. The final weight of the batch was 3925 g. and the concentration of blowing agent from the amount of rubber used was 49%.

Portions of this master batch and the product of Example 1 were tested in typical sponge formulas with satisfactory results. One such formula in which the new blowing agent of the invention may be used is as follows:

| | Parts by weight |
|---|---|
| Pale crepe rubber | 100.00 |
| Zinc oxide | 5.00 |
| Stearic acid | 12.00 |
| Di (benzothiazyl) disulphide | 0.50 |
| Sulphur | 3.50 |
| Petrolatum | 10.00 |
| Blowing agent (Example 1) | 3.50 |

The above examples are merely in illustration of two methods by which the new material may be prepared. Other methods or modifications of these will readily suggest themselves to the chemist. For example, a wide variety of solvents or suspending medium may be employed, or instead of solid ammonium carbonate or bicarbonate the gaseous elements, ammonia and carbon dioxide, may be used directly by passing them into a suitable medium, such as methanol or ethanol, in which zinc oxide is suspended. The times of reaction and of drying, too, may be varied within wide limits, those given in the illustrative examples being longer than necessary. The reaction will take place within a few hours, or even less; particularly, if there is applied a small amount of heat—insufficient, of course, to cause decomposition of the product of the invention. Where ammonia and carbon dioxide are added to zinc oxide in a liquid medium, two or three hours or less is sufficient time. The drying time, also, of course, is greatly variable. With ammonia and carbon dioxide, instead of ammonium carbonate or ammonium bicarbonate, no water is formed by the reaction, and so, the drying time depends to a large extent on the volatility of the medium and the method used to remove it.

It is intended that the patent shall cover, by suitable expression in the appended claims, all features of patentable novelty residing in the invention.

What I claim is:

1. A rubber master batch of a new compounding ingredient prepared by mixing zinc oxide and ammonium bicarbonate in rubber, allowing a reaction to take place with formation of water and drying the resulting mixture under conditions preventing substantial decomposition of the resulting solid product of the reaction of the zinc oxide and the ammonium bicarbonate.

2. The process of preparing a new composition of matter which comprises reacting zinc oxide, ammonia and carbon dioxide in a non-aqueous liquid medium and drying the resulting product under conditions preventing decomposition of the said product.

3. A process of preparing sponge rubber which comprises incorporating in a vulcanizable rubber composition the solid material having a composition corresponding approximately to the empirical formula $ZnO.CO_2.NH_3$, said solid material being obtainable by reacting in alcohol ammonium bicarbonate and zinc oxide, and filtering and drying the resulting product under conditions preventing decomposition of the said product; and vulcanizing.

4. A process of preparing sponge rubber which comprises incorporating in a vulcanizable rubber composition a crystalline powder containing in combined form zinc oxide, carbon dioxide and ammonia.

ALBERT F. HARDMAN.